(12) United States Patent
Vander Veen

(10) Patent No.: US 8,949,355 B2
(45) Date of Patent: *Feb. 3, 2015

(54) METHOD FOR DISAMBIGUATING EMAIL RECIPIENT FIELDS IN AN ELECTRONIC DEVICE

(75) Inventor: Raymond Paul Vander Veen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 205 days.

This patent is subject to a terminal disclaimer.

(21) Appl. No.: 13/613,007

(22) Filed: Sep. 13, 2012

(65) Prior Publication Data

US 2013/0036182 A1    Feb. 7, 2013

Related U.S. Application Data

(63) Continuation of application No. 11/877,745, filed on Oct. 24, 2007, now Pat. No. 8,307,039.

(51) Int. Cl.
*G06F 15/16*     (2006.01)
*G06Q 10/10*     (2012.01)
*H04M 1/725*     (2006.01)

(52) U.S. Cl.
CPC .......... *G06Q 10/107* (2013.01); *H04M 1/72552* (2013.01)
USPC ........................................ 709/206; 715/739

(58) Field of Classification Search
CPC ........................... H04L 61/1511; H04L 61/15
USPC .......... 709/206–207, 245–246, 203; 715/739, 715/244–247
See application file for complete search history.

(56) References Cited

U.S. PATENT DOCUMENTS

| 7,280,999 | B2 * | 10/2007 | Chung et al. | 709/206 |
| 2003/0005157 | A1 * | 1/2003 | Chung et al. | 709/245 |
| 2003/0046353 | A1 * | 3/2003 | Chung et al. | 709/206 |
| 2010/0235911 | A1 * | 9/2010 | Nooren | 709/206 |
| 2010/0312837 | A1 * | 12/2010 | Bodapati et al. | 709/206 |

OTHER PUBLICATIONS

U.S. Appl. No. 11/877,745 entitled "Method for Disambiguating Email Recipient Fields in an Electronic Device" filed Oct. 24, 2007.

* cited by examiner

*Primary Examiner* — Bharat N Barot
(74) *Attorney, Agent, or Firm* — Perry + Currier Inc.

(57) ABSTRACT

An electronic device and a method implemented within the electronic device for disambiguating email recipient fields by extracting sufficient information from the domain portion of an intended recipient's email address to disambiguate between a personal and a business email address. An exemplary method includes parsing at least one of said multiple addresses in a recipient field of the email to extract information capable of distinguishing the at least one of said multiple addresses from at least another of the multiple addresses, and displaying the information in the recipient field of the email.

18 Claims, 4 Drawing Sheets

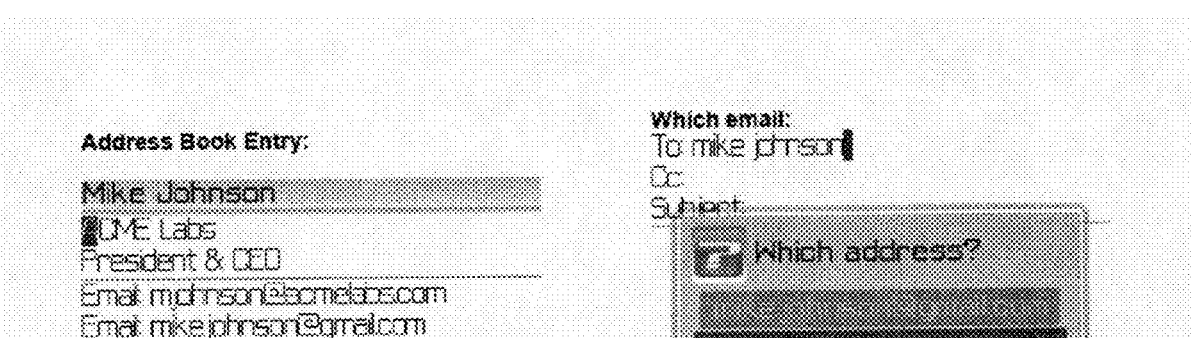
Fig. 3A
Fig. 3B
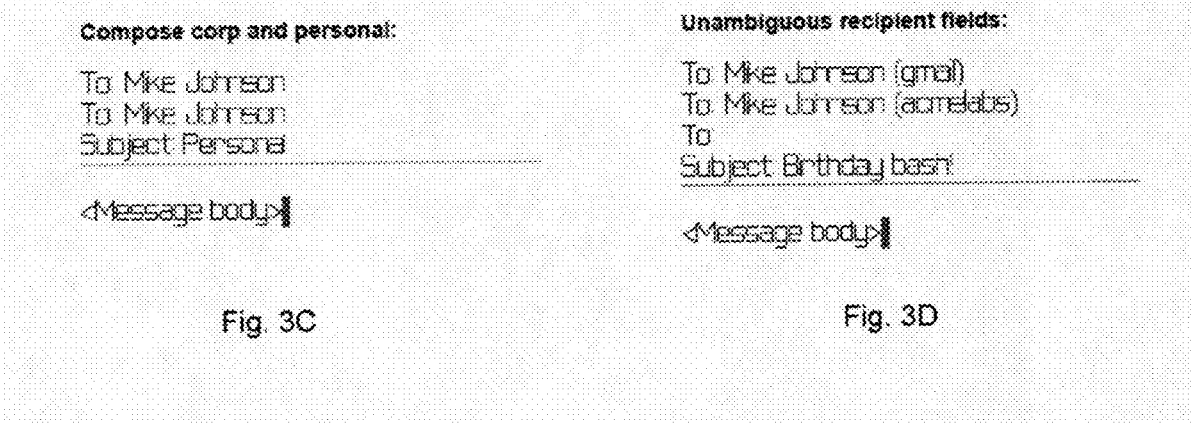
Fig. 3C
Fig. 3D

METHOD FOR DISAMBIGUATING EMAIL RECIPIENT FIELDS IN AN ELECTRONIC DEVICE

CROSS-REFERENCE TO RELATED APPLICATION(S)

This application is a continuation of U.S. application Ser. No. 11/877,745 filed Oct. 24, 2007 now U.S. Pat. No. 8,307, 039, the contents of which are incorporated herein by reference.

FIELD

The present disclosure relates to electronic devices, and in particular to a method for disambiguating email recipient fields in an electronic device.

BACKGROUND

Address book applications may be used for storing names, addresses, telephone and mobile phone numbers, fax numbers, email addresses, etc. Also, multiple addresses may be provided for each address book entry, such as one or more home phone and email addresses and one or more business phone and email addresses. In addition, address book applications may prompt a user to select one from a multitude of phone and email addresses when placing a call or composing an email message.

In the context of email, there are some circumstances in which a user may require a clear indication of which of a multitude of email addresses has been selected while composing an email. For example, if an email contains potentially sensitive company information it may be important for the user to be confident that the Intended recipient's business email address has been selected, rather than a home or personal email address. Conversely, if the email contains potentially sensitive personal information it may be important for the user to be confident that the intended recipient's home or personal email address has been selected, rather than the recipient's business email address.

Thus, in general, a problem exists in providing an indication to a user of which of a multitude of email addresses has been selected while composing an email.

BRIEF DESCRIPTION OF THE DRAWINGS

The embodiments will be better understood with reference to the following Figures in which like numerals denote like parts and in which:

FIGS. 3A-3D are screen shot representations of a graphical user interface associated with disambiguating email recipient fields according to an exemplary embodiment.

DETAILED DESCRIPTION

In one aspect, discussed in greater detail below with reference to FIGS. 1-4, a method is set forth of disambiguating multiple addresses of an intended email recipient, comprising parsing at least one of the multiple addresses in a recipient field of the email to extract information capable of distinguishing the at least one of the multiple addresses from at least another of the multiple addresses, and displaying the information in the recipient field of the email.

In another aspect there is set forth a portable electronic device including a memory having recorded thereon statements and instructions for execution by a processor to carry out the foregoing method.

Figure 1:
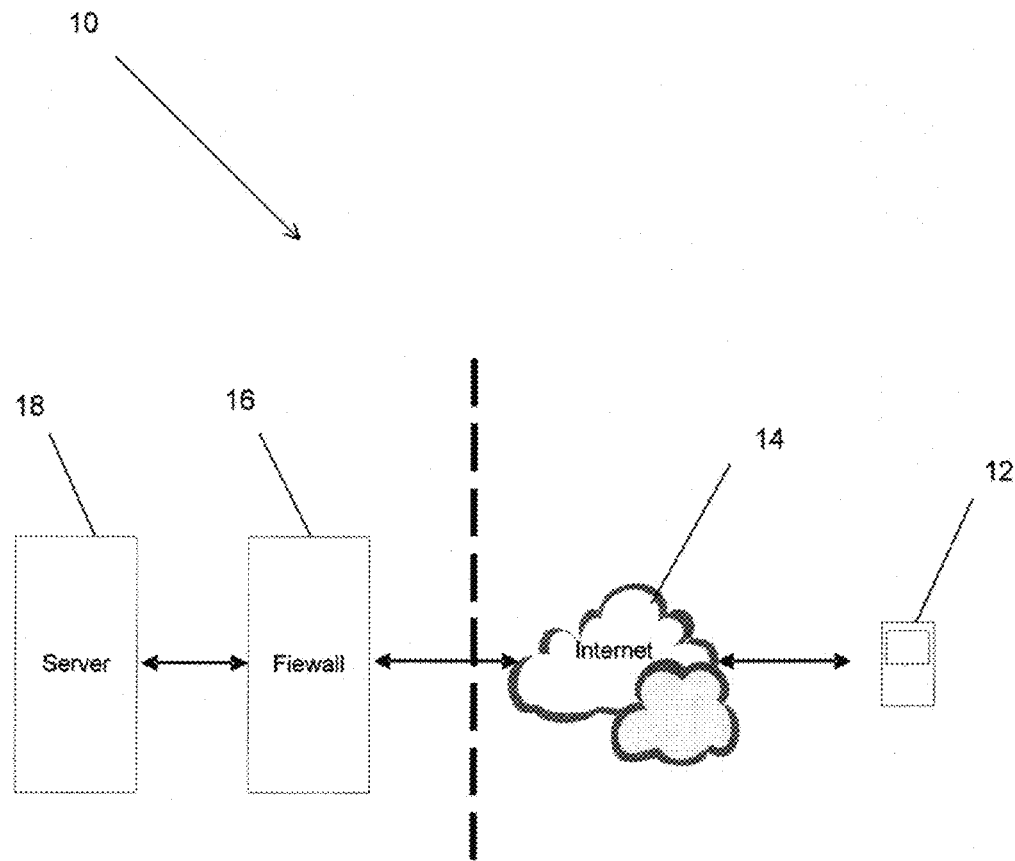
FIG. 1 is a schematic diagram of a wireless communication system.

FIG. 1 shows an exemplary communication system 10 for a portable electronic device 12. The portable electronic device 12 is operable to effect communications over a radio communications channel and communicates with a base station (not shown) while located within a coverage area that is defined by the base station. The base station is part of a wireless network that is in communication with the Internet 14. Data is delivered to the portable electronic device 12 via wireless transmission from the base station. Similarly, data is sent from the portable electronic device 12 via wireless transmission to the base station.

It will be appreciated that the portable electronic device 12 is movable within the coverage area and can be moved to coverage areas defined by other base stations. Further, as will be understood by one of ordinary skill in the art, wireless networks include GSM/GPRS, CDPD, TDMA, iDEN, Mobitex, DataTAC networks, EDGE, EVDO or UMTS and broadband networks such as Bluetooth and variants of 802.11.

A server 18 handles wireless client requests from the portable electronic device 12. A firewall, or proxy server, 16, is provided between the server 18 and the Internet 14. The server 18 further operates as a Mail Server, which communicates with an email client of the portable electronic device 12 to allow a user to send and receive email messages.

Figure 2:
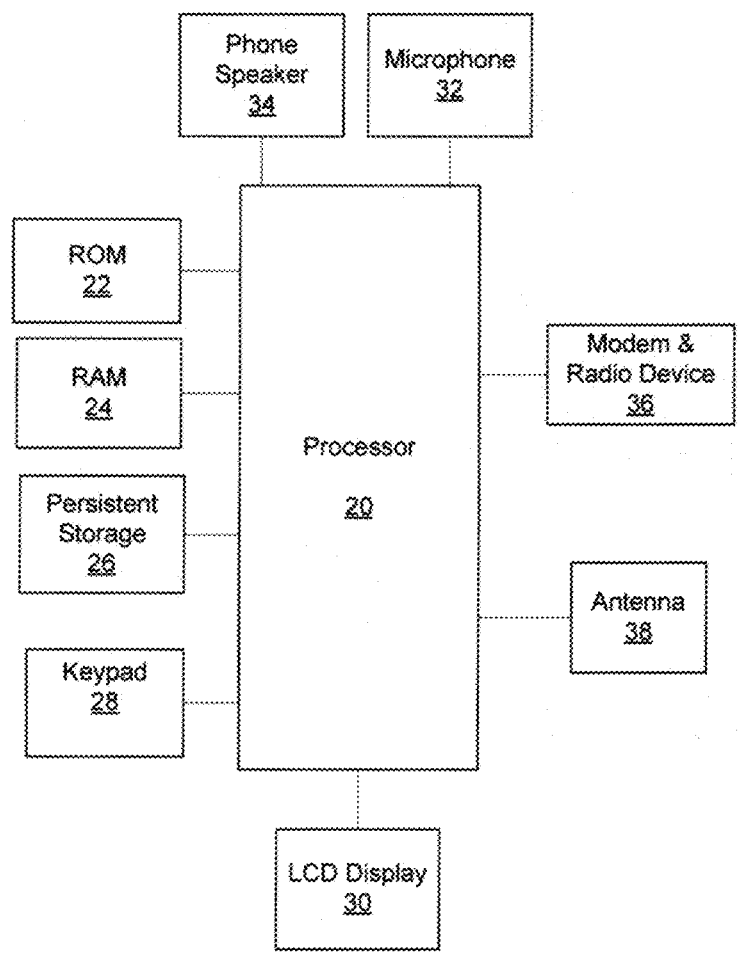
FIG. 2 is a block diagram of components of a portable electronic device.

FIG. 2 is a block diagram showing certain components within an exemplary embodiment of the portable electronic device 12. In this embodiment, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones, and laptop computers.

The portable electronic device 12 includes a processor 20 connected to a read-only-memory (ROM) 22 that contains a plurality of applications executable by the processor 20 for enabling each portable electronic device 12 to perform certain functions including, for example, PIN message functions, SMS message functions, address book and calendaring functions, and cellular telephone functions. The processor 20 is also connected to a random access memory unit (RAM) 24 and a persistent storage device 26 to facilitate various non-volatile storage functions of the portable electronic device 12. The processor 20 receives input from one or more input devices, including a keypad 28. The processor 20 outputs to one or more output devices, including an LCD (Liquid Crystal Display) display 30. A microphone 32 and phone speaker 34 are connected to the processor 20 for cellular telephone functions. The processor 20 is also connected to a modem and radio device 36. The modem and radio device 36 is used to connect to wireless networks and transmit and receive voice and data communications through an antenna 38.

As discussed above, it is common for electronic device 12 to implement an address book application for storing names, addresses, telephone and mobile phone numbers, fax numbers, email addresses, etc. As shown in FIG. 3A, multiple addresses and phone numbers may be stored for each address book entry, such as a home phone (1-213-334-8848), home email address (mikejohnson@gmail.com), a business phone (1-800-GET-ACME) and business email address (mjohnson@acmelabs.com). It is also common for such address book applications to prompt a user to select one from a multitude of phone and email addresses to place a call or compose an email message, as shown in FIG. 3B. It will be noted that the address book application conventional displays a 'short form' of the intended recipient's name. Thus, in FIG. 3B when mjohnson@acmelabs.com is selected, the address book application simply displays "Mike Johnson" in the "To:" field of the email message being composed. Accordingly, there is no way of distinguishing between the intended recipient's personal and business email addresses.

In the context of email, there are some circumstances in which a user may require a clear visual indication of which of a multitude of email addresses has been selected while composing an email. For example, if an email contains potentially sensitive company information it may be important for the user to be confident that the intended recipient's business email address has been selected, rather than a home or personal email address. Conversely, if the email contains potentially sensitive personal information it may be important for the user to be confident that the intended recipient's home or personal email address has been selected, rather than the recipient's business email address. Alternatively, if the user is uncertain as to whether the intended recipient (Mike Johnson) is at home or at the office on a given day at a given time, the user may specify both the personal and business email address, as shown in FIG. 3C.

If, for some reason, the user decides that the content of the email message being composed is not appropriate for the intended recipient's business email address the user may wish to delete the intended recipient's business email address from the "To:" field of the email message. However, there is no way to discern between the personal and business email addresses in the conventional display of FIG. 3C.

One possible solution is to include the intended recipient's full email address after the short form name (e.g. To: Mike Johnson (mjohnson@acmelabs.com) and To: Mike Johnson (mike.johnson@gmail.com). However, display of the intended recipient's full email address after the short form name is typically not feasible on a portable electronic 12 having only limited screen real estate.

Therefore, in accordance with an aspect of an embodiment of a method for disambiguating email recipient fields in an electronic device sufficient information is extracted from the domain portion of an intended recipient's email address to disambiguate between a personal and a business email address. Thus, as shown in FIG. 3D, the first (i.e. left-most) label of the domain is displayed after the name of the intended recipient, thereby clearly distinguishing between the personal email address (gmail) and the business email address (acmelabs).

Figure 4:
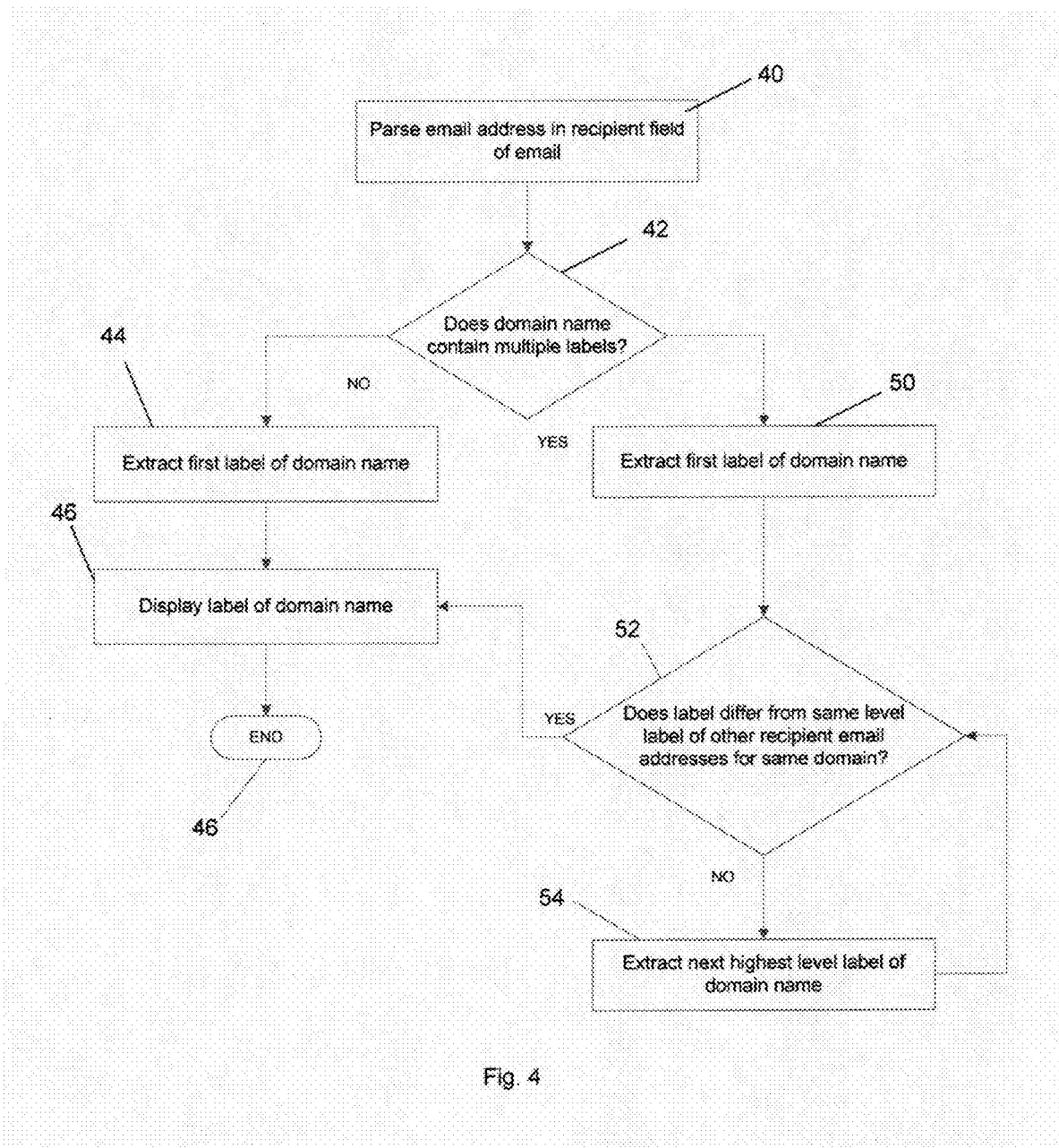
FIG. 4 is a flowchart showing a method for disambiguating email recipient fields according to an exemplary embodiment.

Referring to FIG. 4, a flowchart is provided showing a method for disambiguating email recipient fields according to an exemplary embodiment. At step 40, the email address in the recipient field (e.g. mike.johnson@gmail.com) is parsed. The "second-level" domain directly to the left of the top level domain (i.e. gmail) is extracted (step 44) and then displayed (step 46). In one embodiment, the second-level domain (or "lowest level label" using the terminology of RFC 1034) is displayed adjacent the 'friendly' name (Mike Johnson) of the intended recipient, as shown in FIG. 3D.

Although in many cases, the first label of the domain name will be sufficient to disambiguate the intended recipient's email address, where the domain name contains multiple labels (step 42), the exemplary method of FIG. 4 extracts the first label of the domain name (step 50). If the first label (e.g. "city" in the domain name "city.waterloo.on.ca") is sufficient (i.e. a "YES" at step 52) to distinguish from the same level label (e.g. first) of any other recipient email addresses for the same domain (e.g. "suburbs" in "suburbs.waterloo.on.ca") then the first label is displayed (step 46). In one embodiment, the label is displayed adjacent the 'friendly' name of the intended recipient (e.g. "To: Mike Johnson (city)").

If the first label is not sufficient to disambiguate the intended recipient's email address, (i.e. a "NO" at step 52), then at step 54 the next highest level label is extracted (e.g. "waterloo" in "city.waterloo.on.ca") and step 52 is repeated. Thus, if Mike Johnson's email address is mjohnson@city.works.waterloo.on.ca, and other users are allocated addresses that are distinguished via the second label (i.e. "works") then repetition of method steps 52 and 54 will distinguish "city.works.waterloo.on.ca" from "city.parks.waterloo.on.ca", as but one example.

A person of ordinary skill in the art will understand that the exemplary method set forth in FIG. 4 may be repeated an additional one or more times to display distinguishing labels for additional recipients identified in additional "To:", "c.c.:" or "b.c.c." fields of the email being composed, or to display distinguishing labels for alternate email addresses for the intended recipient identified in additional "To:", "c.c.:" or "b.c.c." fields of the email being composed, as shown in FIG. 3D.

A specific embodiment has been shown and described herein. However, modifications and variations may occur to those skilled in the art. For example, although the exemplary embodiment has been described in terms of an address book application on a portable handheld electronic device, the principles set forth herein may be applied to address book implementations on other devices such as desktop computers, etc. All such modifications and variations are believed to be within the sphere and scope of the present embodiment.

What is claimed is:

1. A method of disambiguating multiple addresses of an email recipient comprising:
    determining a domain name of at least one of the multiple addresses, the domain name containing multiple labels;
    extracting, at a processor of a device, a first label from the domain name of at least one of the multiple addresses in a recipient field of an email;
    when the first label is not sufficient to disambiguate an email address of the email recipient from the multiple addresses, then iteratively extracting, at the processor, a next highest level label from the domain name and omitting at least a local part of the at least one of the multiple addresses; and,
    displaying extracted labels adjacent a name of the email recipient at a display of the device in the recipient field of the email.

2. The method of claim 1, further comprising parsing the at least one of the multiple addresses to extract at least the first label.

3. The method of claim 1, further comprising determining that the domain name contains the multiple labels including the first label and next highest level labels.

4. The method of claim 1, further comprising:
    determining that the first label is sufficient to disambiguate the email address of the email recipient from the multiple addresses; and,
    displaying the first label adjacent the name of the email recipient at the display in the recipient field of the email.

5. The method of claim 1, wherein when the first label is extracted, a second label of the domain name is omitted.

6. The method of claim 1, further comprising prompting selection of the at least one of the multiple addresses responsive to receipt of the name in the recipient field.

7. The method of claim 1, wherein at least a portion of the domain name of the at least one of the multiple addresses differs from at least a portion of a respective domain name of at least another of the multiple addresses.

8. The method of claim 1, wherein the name is associated with the at least one of the multiple addresses and independent of the at least one of the multiple addresses.

9. A device for disambiguating multiple addresses of an email recipient comprising:
   a processor and a display, the processor configured to:
   determine a domain name of at least one of the multiple addresses, the domain name containing multiple labels;
   extract a first label from the domain name of at least one of the multiple addresses in a recipient field of an email;
   when the first label is not sufficient to disambiguate an email address of the email recipient from the multiple addresses, then iteratively extract a next highest level label from the domain name and omit at least a local part of the at least one of the multiple addresses; and,
   display extracted labels adjacent a name of the email recipient at the display in the recipient field of the email.

10. The device of claim 9, wherein the processor is further configured to parse the at least one of the multiple addresses to extract at least the first label.

11. The device of claim 9, wherein the processor is further configured to determine that the domain name contains the multiple labels including the first label and next highest level labels.

12. The device of claim 9, wherein the processor is further configured to:
   determine that the first label is sufficient to disambiguate the email address of the email recipient from the multiple addresses; and,
   display the first label adjacent the name of the email recipient at the display in the recipient field of the email.

13. The device of claim 9, wherein, when the first label is extracted, a second label of the domain name is omitted.

14. The device of claim 9, wherein the processor is further configured to prompt selection of the at least one of the multiple addresses responsive to receipt of the name in the recipient field.

15. The device of claim 9, wherein at least a portion of the domain name of the at least one of the multiple addresses differs from at least a portion of a respective domain name of at least another of the multiple addresses.

16. The device of claim 9, wherein the name is associated with the at least one of the multiple addresses and independent of the at least one of the multiple addresses.

17. The device of claim 9, further comprising a portable electronic device.

18. A computer program product, comprising a non-transitory computer usable medium having a computer readable program code adapted to be executed to implement a method of disambiguating multiple addresses of an email recipient comprising:
   determining a domain name of at least one of the multiple addresses, the domain name containing multiple labels;
   extracting, at a processor of a device, a first label from the domain name of at least one of the multiple addresses in a recipient field of an email;
   when the first label is not sufficient to disambiguate an email address of the email recipient from the multiple addresses, then iteratively extracting, at the processor, a next highest level label from the domain name and omitting at least a local part of the at least one of the multiple addresses; and,
   displaying extracted labels adjacent a name of the email recipient at a display of the device in the recipient field of the email.

\* \* \* \* \*